United States Patent
Lee et al.

(10) Patent No.: US 12,260,047 B2
(45) Date of Patent: Mar. 25, 2025

(54) TOUCH SENSING DEVICE AND TOUCH SENSING METHOD

(71) Applicant: LX SEMICON CO., LTD., Daejeon (KR)

(72) Inventors: Youngeun Lee, Daejeon (KR); Chinwan Lee, Daejeon (KR); Sangmin Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/364,076

(22) Filed: Aug. 2, 2023

(65) Prior Publication Data

US 2024/0045548 A1    Feb. 8, 2024

(30) Foreign Application Priority Data

Aug. 3, 2022 (KR) .......................... 10-2022-0096665

(51) Int. Cl.
*G06F 3/041* (2006.01)
*G06F 3/044* (2006.01)

(52) U.S. Cl.
CPC ........ *G06F 3/04184* (2019.05); *G06F 3/0412* (2013.01); *G06F 3/0446* (2019.05); *G06F 3/04186* (2019.05)

(58) Field of Classification Search
None
See application file for complete search history.

(56) References Cited

U.S. PATENT DOCUMENTS

| | | | |
|---|---|---|---|
| 2013/0300692 A1* | 11/2013 | Jang ...................... | G06F 3/0446 345/173 |
| 2015/0277660 A1* | 10/2015 | Yang ..................... | G06F 3/0446 345/173 |
| 2020/0210008 A1* | 7/2020 | Lee ........................ | G06F 3/0442 |

FOREIGN PATENT DOCUMENTS

| KR | 20160119294 | * 10/2016 | ........... G06F 3/0418 |
|---|---|---|---|
| KR | 20160119294 A | 10/2016 | |

OTHER PUBLICATIONS

Extended European Search Report issued for European Application No. 23188285.3, on Jan. 5, 2024, 10 pages.

* cited by examiner

*Primary Examiner* — Krishna P Neupane
(74) *Attorney, Agent, or Firm* — ROTHWELL, FIGG, ERNST & MANBECK, P.C.

(57) ABSTRACT

Touch sensing device and touch sensing method are disclosed. A touch sensing device according to the present disclosure may include a receiving circuit configured to receive a first sensing value generated in a differential mode using a first input signal input to the first sensing electrode and a second input signal input to the second sensing electrode; and a noise determination circuit configured to receive a reference sensing value generated using the second input signal and determining the amount of noise of the first sensing value using the reference sensing value.

17 Claims, 7 Drawing Sheets

TOUCH SENSING DEVICE AND TOUCH SENSING METHOD

CROSS REFERENCE TO RELATED APPLICATION(S)

This application claims priority to Korean Application No. 10-2022-0096665, filed Aug. 3, 2022. The entirety of the disclosure of the above-referenced application is incorporated herein by reference.

TECHNICAL FIELD

The present disclosure relates to a touch sensing device and a touch sensing method.

BACKGROUND

The technology that detects an external object approaching or touching a touch panel is commonly known as touch sensing technology.

The touch panel is positioned on a flat surface at the same location as the display panel. This allows users to input manipulation signals to the touch panel while viewing content on the display panel.

Such manipulation signal input offers remarkable intuitiveness compared to conventional input methods like a keyboard or mouse, providing a more natural and user-friendly experience.

As a result of these advantages, touch sensing technology is being integrated into various electronic devices, including those equipped with display panels.

A touch sensing device provides a driving current to the driving electrode, which is placed on the touch panel, and detects proximity or touch of an external object on the touch panel by receiving response signals formed on the sensing electrode.

On the other hand, the touch panel may be susceptible to noise, which can lead to distortion in the driving signal or response signal, resulting in errors during touch sensing.

With the advancement of display-related technologies, the stack structure of display modules is becoming thinner. Consequently, other stack configurations of display modules, such as display panels, have a higher likelihood of generating noise in touch panels.

Especially, when the display panel's screen is switched to a pattern that generates significant noise (referred to as the worst pattern), it can lead to unintended user touches (known as ghost touches) caused by the noise, potentially resulting in malfunctions of electronic devices.

DISCLOSURE OF THE INVENTION

Technical Problem

In this context, the present disclosure is to assess touch noise caused by the display panel without the need for additional devices. It aims to dynamically ensure touch performance by determining the level of noise filtering based on the amount of noise present. This approach allows for both stable touch performance when no noise is detected and adaptive (or flexible) touch response even in the presence of noise.

Technical Solution

In order to achieve the above object, a touch sensing device may include a receiving circuit configured to receive a first sensing value generated in a differential mode using a first input signal input to the first sensing electrode and a second input signal input to the second sensing electrode; and a noise determination circuit configured to receive a reference sensing value generated using the second input signal and determining the amount of noise of the first sensing value using the reference sensing value.

A touch sensing method may include inputting a touch to a first sensing electrode and a second sensing electrode; generating a first sensing value in a differential mode using a first input signal input to the first sensing electrode and a second input signal input to the second sensing electrode; generating a reference sensing value based on the second input signal; and determining the amount of noise of the first sensed value based on the reference sensing value.

Effect of the Invention

The present disclosure allows for flexible filtering of touch noise based on the amount of noise without additional devices, providing the effect of dynamically adapting to touch noise.

DETAILED DESCRIPTION OF THE INVENTION

Figure 1:
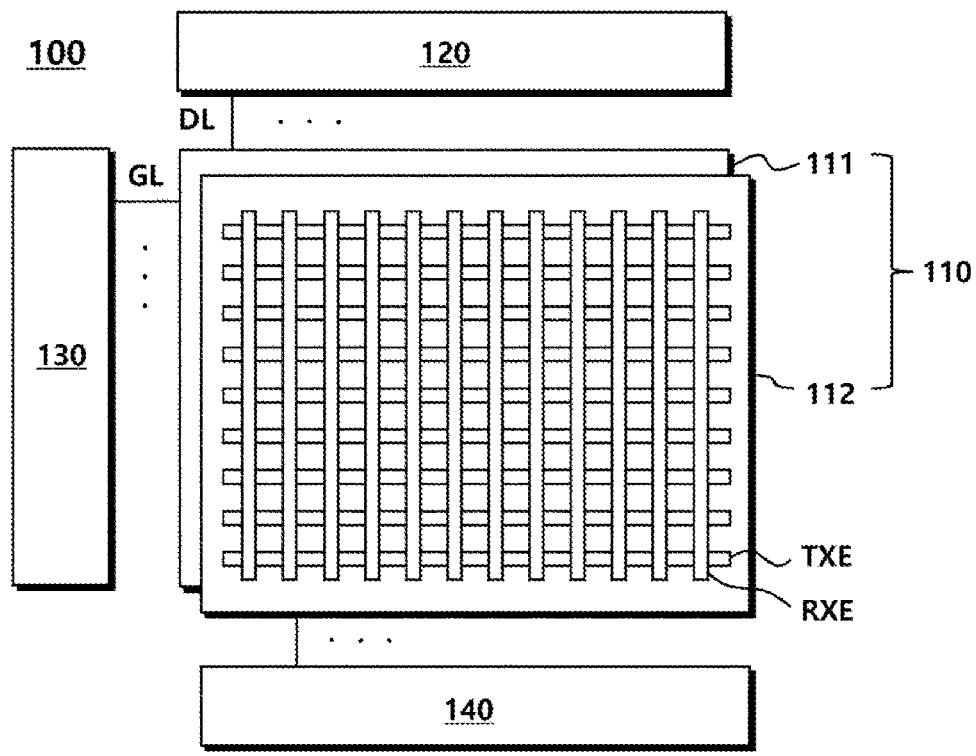
FIG. 1 is a block diagram illustrating a display device.

FIG. 1 is a block diagram illustrating a display device.

Referring to FIG. 1, the display device 100 may include a display panel 111, a touch panel 112, a data driving device 120, a gate driving device 130, a touch sensing device 140, and the like.

A plurality of data lines DL connected to the data driving device 120 may be formed in the display panel 111. A plurality of gate lines GL connected to the gate driving device 130 may be formed in the display panel 111. Moreover, a plurality of pixels which correspond to intersections of the plurality of data lines DL and the plurality of gate lines GL may be defined in the display panel 111.

A transistor may be formed in each of these pixels. A first electrode of the transistor (e.g., a source electrode or a drain electrode) may be connected to the data line DL. A gate electrode of the transistor may be connected to the gate line GL. A second electrode (e.g., a drain electrode or a source electrode) of the transistor may be connected to a display electrode.

The touch panel 112 may be positioned on one side—upper or lower—of the display panel 111. A plurality of driving electrodes (TXE) and a plurality of sensing electrodes (RXE) may be disposed on the touch panel 112.

The display panel 111 and the touch panel 112 may be positioned separately from each other. A panel may be manufactured in such a way that the touch panel 112 formed through a separate process may be attached to the display panel 111. The panel may include a panel known as an add-on type.

The data driving device 120 may supply a data signal to the data line DL to display a digital image on each pixel of the display panel 111.

The data driving device 120 may include at least one data driver integrated circuit. The at least one data driver integrated circuit may be connected to a bonding pad of the display panel 111 through a Tape Automated Bonding (TAB) method or a Chip On Glass (COG) method, formed directly on the display panel 111, or integrated and formed on the display panel 111 in some cases. Moreover, the data driving device 120 may be implemented in a Chip On Film (COF) method.

The gate driving device 130 may sequentially supply a scan signal to the gate line GL to turn on or turn off the transistor formed in each pixel.

The gate driving device 130 may be positioned on one side of the display panel 111 based on the driving method as shown in FIG. 1. The gate driving device 130 may be divided and positioned on both sides of the display panel 111.

The gate driving device 130 may include at least one gate driver integrated circuit. The at least one gate driver integrated circuit may be connected to a bonding pad of the display panel 111 by the TAB method or the COG method, implemented in a Gate In Panel (GIP) type and directly formed on the display panel 111, or integrated and formed on the display panel 111 in some cases. Moreover, the gate driving device 130 may be implemented in the COF method.

The touch sensing device 140 may supply a driving signal to the driving electrode (TXE) and receive a response signal in response to the driving signal from the sensing electrode (RXE). The touch sensing device 140 may sense a touch or proximity of an external object to the touch panel 112 according to the response signal.

A panel 110 may include both the display panel 111 and the touch panel 112. The touch panel 112 may be disposed on another layer, such as above or below the display panel 111. The touch panel 112 may be implemented in a form embedded in the display panel 111. The touch panel 112 may be disposed on the display panel 111 in an on-cell type or an in-cell type.

In FIG. 1, one touch sensing device 140 is positioned in the display device 100. Two or more touch sensing devices 140, however, may be included in the display device 100.

The display device 100 may employ a capacitive touch method. Accordingly, the display device 100 may recognize proximity or touch of an object by detecting a change in capacitance through the sensing electrode (RXE).

The capacitive touch method includes a mutual capacitance touch method and a self-capacitance touch method.

The mutual capacitance touch method, a type of capacitive touch technology, enables touch or proximity sensing on the touch panel 112 by supplying a driving signal to the driving electrode (TXE) and receiving a response signal from the sensing electrode (RXE) capacitively coupled with the driving electrode (TXE). In this approach, the sensing value obtained from the sensing electrode (RXE) varies depending on the proximity or touch of an object, such as a finger or a pen. The mutual capacitance touch method utilizes this sensed value from the sensing electrode (RXE) to detect touch presence, touch coordinates, and other relevant information.

The self-capacitance touch method, another type of capacitive touch technology, involves supplying a driving signal to the driving electrode (TXE) and then sensing the same driving electrode (TXE) again. Unlike the mutual capacitance touch method, the self-capacitance touch method does not distinguish between the driving electrode (TXE) and the sensing electrode (RXE). In this approach, the value sensed by the driving electrode (TXE) changes depending on the proximity or touch of an object, such as a finger or pen. The self-capacitance touch method utilizes this sensed value from the driving electrode (TXE) to detect touch presence, touch coordinates, and other relevant information.

The display device 100 may employ the mutual capacitance touch method or self-capacitance touch method as described above. In the present disclosure, embodiments are described that the mutual capacitance touch method is employed in the display device 100.

Figure 2:
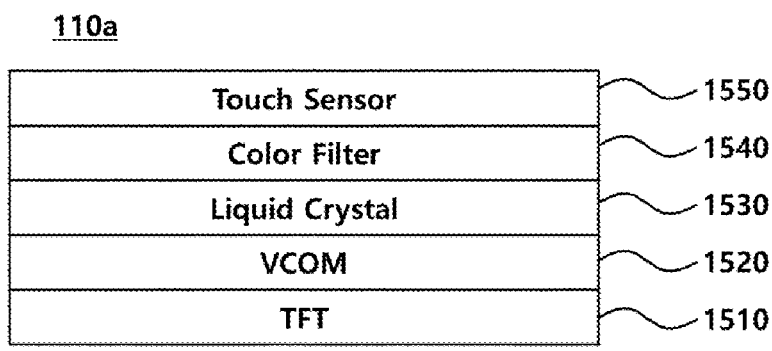
FIG. 2 is a diagram illustrating a panel which is composed of an LCD panel.

FIG. 2 is a diagram illustrating a panel which is composed of an LCD panel.

Referring to FIG. 2, a panel 110a may include a thin film transistor TFT substrate 1510, a common electrode layer 1520, a liquid crystal layer 1530, a color filter layer 1540, a touch sensor layer 1550, and the like.

A transistor disposed in a pixel and a pixel electrode may be disposed on the TFT substrate 1510. A common electrode may be disposed on the common electrode layer 1520. The TFT substrate 1510 and the common electrode layer 1520 may be collectively referred to as a display electrode layer.

The display electrodes, such as a gate line, a data line, a common electrode, and the like, may be disposed in the display electrode layer. Moreover, the liquid crystal layer 1530 and/or the color filter layer 1540 may be interposed between the display electrode layer and the touch sensor layer 1550. Due to the liquid crystal layer 1530 and/or the color filter layer 1540, the parasitic capacitance may be formed between the display electrode and the touch sensor.

A touch input signal formed on the touch sensor layer 1550 may be affected by a parasitic capacitance.

Figure 3:
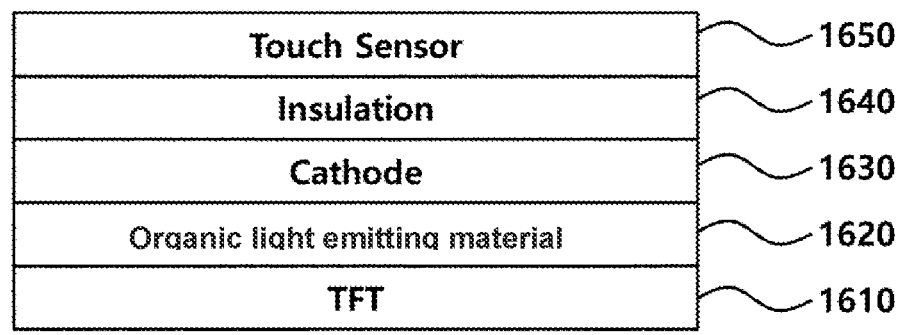
FIG. 3 is a diagram illustrating a panel which is composed of an OLED panel.

FIG. 3 is a diagram illustrating a panel which is composed of an OLED panel.

Referring to FIG. 3, a panel 110b may include a TFT substrate 1610, an organic light emitting material layer 1620, a cathode electrode layer 1630, an insulating layer 1640, a touch sensor layer 1650, and the like.

A transistor disposed in a pixel and an anode electrode may be disposed on the TFT substrate 1610. An organic light emitting material that emits light by electrical energy may be disposed on the organic light emitting material layer 1620. Moreover, a cathode electrode that supplies a base voltage to the OLED may be disposed on the cathode electrode layer 1630. The TFT substrate 1610, the organic light emitting material layer 1620, and the cathode electrode layer 1630 may be collectively referred to as a display electrode layer.

The display electrode layer may contain various display electrodes such as gate lines, data lines, anode electrodes, and cathode electrodes. Additionally, there may be an insulating layer 1640 or similar materials placed between the display electrode layer and the touch sensor layer 1650. This insulating layer 1640 can lead to the formation of parasitic capacitance between the display electrode and the touch sensor. In the case of OLED panels, the parasitic capacitance (parasitic capacitance) can arise due to the presence of a cathode electrode (cathode layer) in the OLED panel.

A touch input signal formed on the touch sensor layer 1650 may be affected by such parasitic capacitance.

Figure 4:
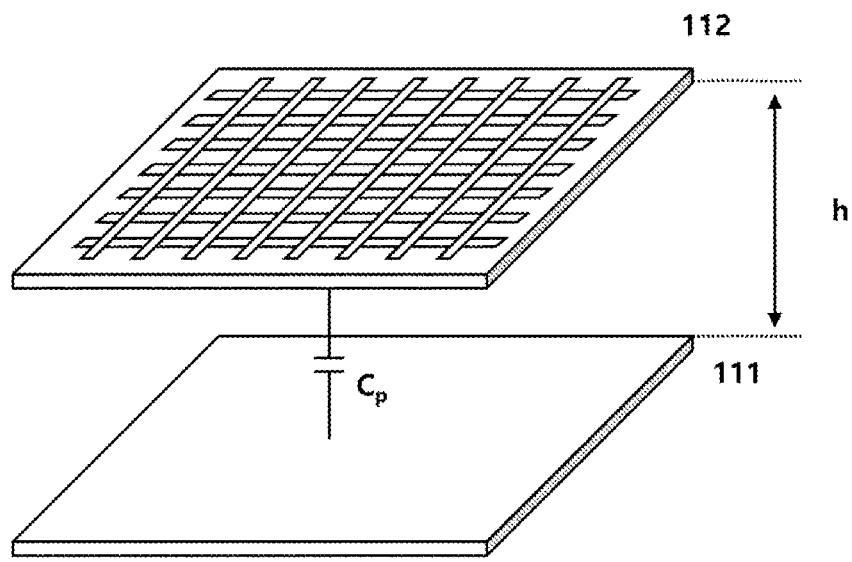
FIG. 4 is a diagram illustrating a noise flowing into a touch panel from a display panel.

FIG. 4 is a diagram illustrating a noise flowing into a touch panel from a display panel.

Referring to FIG. 4, the touch panel 112 and the display panel 111 may be disposed while being spaced apart from each other by a predetermined distance. The touch panel 112 and the display panel 111 may be disposed while being spaced apart by a first distance (h).

At this time, noise may occur according to the operation of the display panel 111. For example, noise can be an irregular voltage or signal. A capacitor Cp (or a parasitic capacitor) may be formed between the touch panel 112 and the display panel 111, and noise may flow into the touch panel 112 through the capacitor Cp.

For example, as the distance h between the touch panel 112 and the display panel 111 may decrease, the size of noise introduced from the display panel 111 may increase. As the distance h between the touch panel 112 and the display panel 111 may decrease, the size of the capacitor Cp may increase. Moreover, as the size of the capacitor Cp may increase, the amount of noise introduced from the display panel 111 may increase.

A noise from the display panel 111 may vary according to a pattern of a screen output from the display panel 111. There may be a first screen pattern, which may be referred to as a worst screen pattern, generating relatively large noise, and a second screen pattern generating relatively small noise in the display panel 111.

The noise generated from the display panel 111 may flow into the sensing electrode RXE or various lines connected to the sensing electrode RXE. The touch sensing circuits connected to the sensing electrode RXE may transmit the input signal and noise together. Accordingly, the touch sensing circuits may not perform an accurate touch sensing operation due to noise, thereby reducing a reliability of a recognition with respect to a touch operation.

Figure 5:
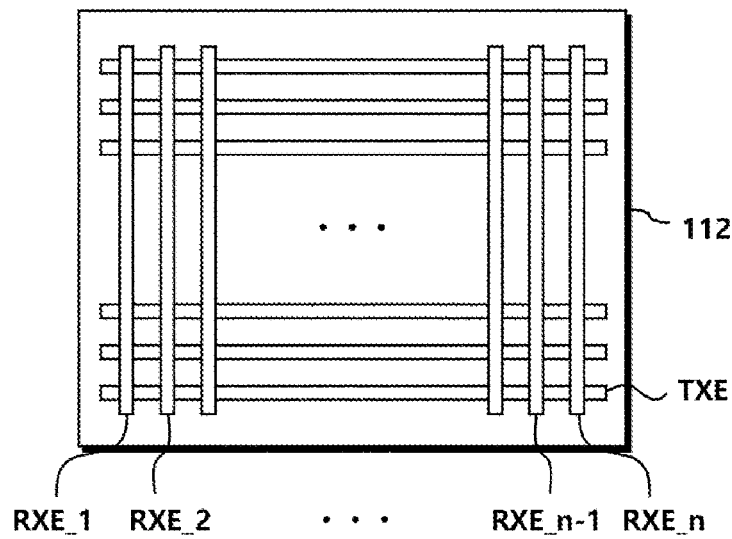
FIG. 5 is a diagram illustrating a sensing electrode for determining noise.

FIG. 5 is a diagram illustrating a sensing electrode for determining noise.

Referring to FIG. 5, a plurality of driving electrodes TXE and a plurality of sensing electrodes RXE may be disposed on the touch panel 112.

For example, there may be n sensing electrodes (RXE_1, RXE_2, . . . , RXE_n−1, RXE_n) in the touch panel 112. The sensing values may be generated in a differential method using the n sensing electrodes. Input signals from the first sensing electrode RXE_1 and the second sensing electrode RXE_2 may be supplied in the differential method, and a sensing value for the first sensing electrode RXE_1 may be derived (or calculated) from a device related to touch sensing. there is. Moreover, a sensing value for the second sensing electrode RXE_2 may be derived based on input signals from the second sensing electrode RXE_2 and the third sensing electrode RXE_3. In view of the above, a sensing value for the n−1th sensing electrode RXE_n−1 may be derived from input signal from the n−1th sensing electrode RXE_n−1 and the n-th sensing electrode RXE_n. In another embodiment, the input signals from the first sensing electrode RXE_1 and the second sensing electrode RXE_2 may be supplied in a differential manner, and thereafter, sensing value for the second sensing electrode RXE_2 may be derived from a device related to touch sensing. Moreover, a sensing value for the third sensing electrode RXE_3 may be derived using input signals from the second sensing electrode RXE_2 and the third sensing electrode RXE_3. In view of the above, a sensing value for the n-th sensing electrode RXE_n may be derived from based on input signals from the n−1th sensing electrode RXE_n−1 and the n-th sensing electrode RXE_n.

In this way, when deriving sensing values through a differential method, one (or more) sensing electrode(s) (RXE_n or RXE_1) may remain. The remaining sensing electrode(s) may be utilized for sensing in a single method to determine the amount of noise. These remaining sensing electrodes may be disposed at the edges of the touch panel 112.

The term "differential method" may generally refer to a technique that utilizes the signal difference between two wires (or conductors). In this method, when both wires are affected by the same noise, the difference between their signals may be employed, effectively reducing the impact of the noise.

The term "single method" may generally refer to a technique that uses a signal through a single wire (or conductor). In this method, since the signal is transmitted through only one wire, if noise is present in that wire, the signal may be significantly affected by the noise.

Although the differential method may reduce the impact of noise, it may not be effective when two wires are affected by different noise sources. Therefore, to further mitigate noise in the sensing values obtained through the differential method, it is possible to use the signal input to one of the plurality of sensing electrodes (RXE) for noise determination and perform additional noise removal.

Figure 6:
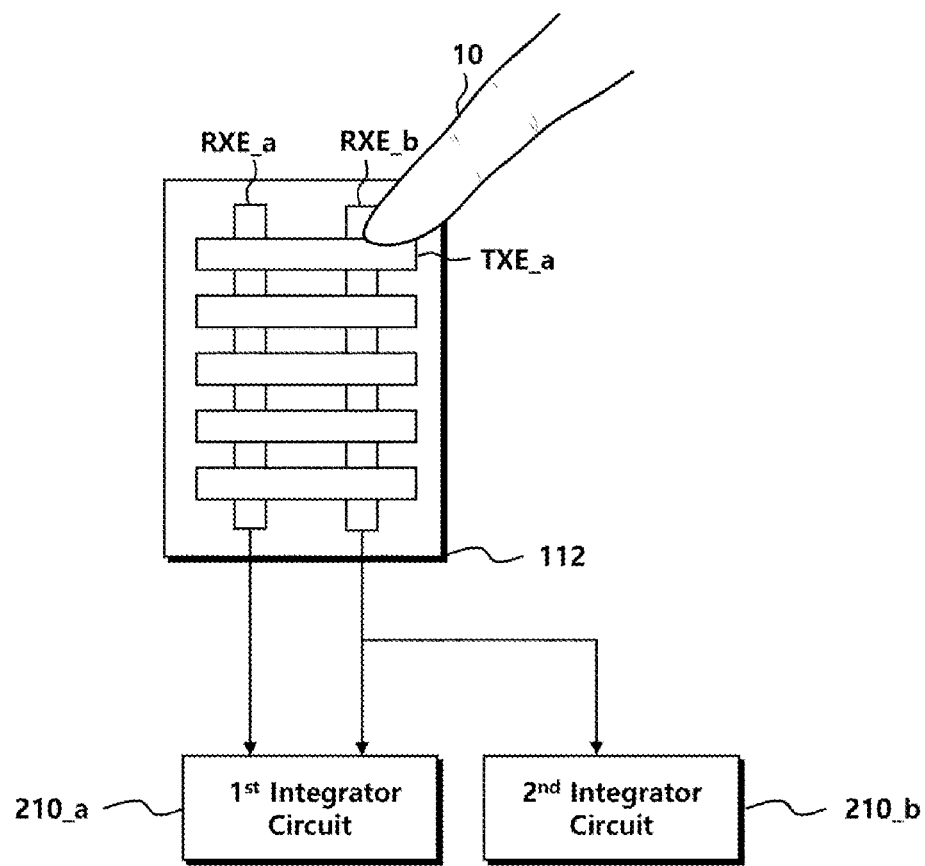
FIG. 6 is a diagram illustrating a connection between an integrating circuit and a sensing electrode.

FIG. 6 is a diagram illustrating a connection between an integrator circuit and a sensing electrode.

Referring to FIG. 6, a first sensing electrode (RXE_a) and a second sensing electrode (RXE_b) among a plurality of sensing electrodes (RXE) are a first integration circuit 210_*a* and a second integration circuit 210_*a* among a plurality of integration circuits 210. It may be connected to two integration circuits 210_*b*, and among the plurality of sensing electrodes (RXE), the second sensing electrode (RXE_b) may be connected to the second integration circuit 210_*b* among the plurality of integration circuits.

The first sensing electrode (RXE_a) and the second sensing electrode (RXE_b) may be coupled with the first driving electrode (TXE a), which receives a driving signal. Additionally, these sensing electrodes (RXE_a and RXE_b) may be located on the display panel 111, but are not limited to the arrangement.

The first sensing electrode (RXE_a) and the second sensing electrode (RXE_b) may be positioned adjacent to each other, and the second sensing electrode (RXE_b) may be a sensing electrode, which is disposed at an edge of the display panel 111, among the plurality of sensing electrodes (RXE). However, this arrangement is not limited to this specific configuration.

A user may input a touch to the first sensing electrode (RXE_a) and the second sensing electrode (RXE_b), and the first input signal generated from the first sensing electrode RXE_a and the second sensing electrode (RXE_b) The second input signal generated in may be supplied to the first integration circuit 210_*a*. In addition, the second input signal generated from the second sensing electrode (RXE_b) may also be supplied to the second integration circuit 210_*b*.

Here, noise from the display panel 111 may be introduced into the first input signal generated from the first sensing electrode (RXE_a) and the second input signal generated from the second sensing electrode (RXE_b). Alternatively, noise from the display panel 111 may be introduced while the first input signal and the second input signal are supplied to the first integration circuit 210_a and the second integration circuit 210_b.

In addition, parasitic capacitance Cp, which may be a cause of noise, may be formed between the first sensing electrode (RXE_a) and the second sensing electrode (RXE_b) and the display panel 111.

That is, the first sensing electrode (RXE_a) and the second sensing electrode (RXE_b) may be connected to the first integration circuit 210_a in a differential manner, and the second sensing electrode (RXE_b) may be connected to the second integration circuit 210_b and may be connected in a single-ended mode.

The first integration circuit 210_a may receive the first input signal and the second input signal in a differential manner, and may supply an integrated value to another circuit. The second integration circuit 210_b may receive the second input signal in a single method and may supply an integrated value to another circuit.

Figure 7:
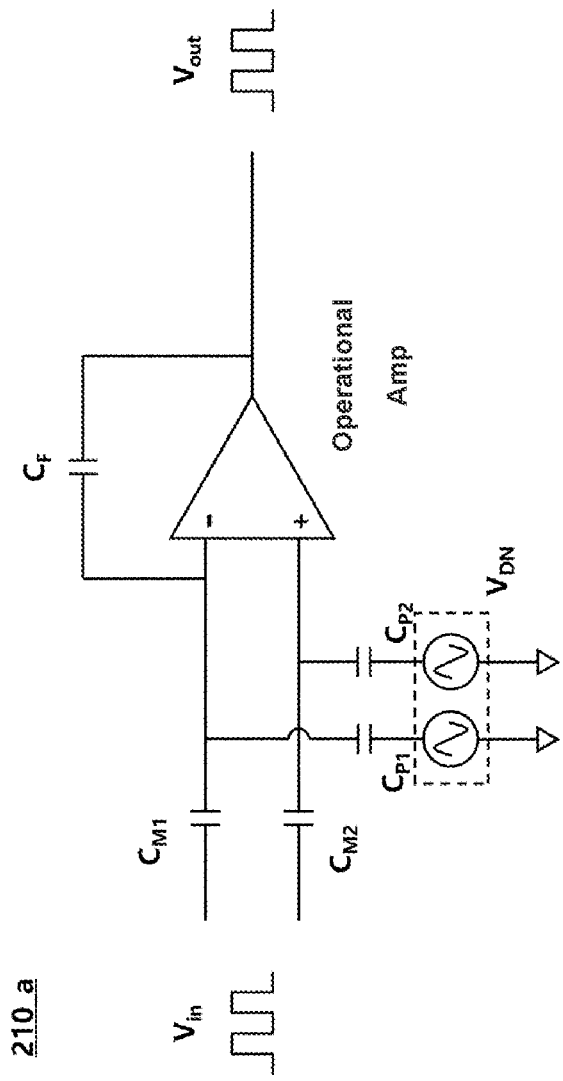
FIG. 7 is a circuit diagram illustrating a first integrator circuit.

FIG. 7 is an exemplary diagram of a first integrator circuit.

Referring to FIG. 7, a first integration circuit 210_a according to an embodiment may include capacitors CM1 and CM2, a feedback capacitor CF, and an operational amplifier. In addition, parasitic capacitances CP1 and CP2 may be formed at the input terminals of the operational amplifier by the display panel, through which the noise (VDN) due to the display panel may be introduced.

The capacitors CM1 and CM2 may be charged by a driving signal and discharged to a ground voltage. Also, the capacitors CM1 and CM2 may correspond to capacitors charged with capacitance to be measured by the touch sensing device according to an embodiment. For example, the capacitors CM1 and CM2 may correspond to mutual-capacitance generated between a plurality of electrodes included in a capacitive touch panel. In this case, the capacitors CM1 and CM2 may be regarded as corresponding to node capacitors in which charges are charged or discharged by a change in combined capacitance generated at the intersection of a plurality of electrodes.

The first integration circuit 210_a may receive the input signal Vin in a differential manner and output an output signal Vout, and the output signal Vout integrates the input signal Vin. It may represent a value. The output signal Vout may be a signal into which a noise component (VDN) from the display panel is introduced.

Since the first integration circuit 210_a receives the input signal Vin in a differential manner and outputs the output signal Vout, when the display noise (VDN) flowing into both terminals flows in the same size, the effect of noise on the output signal Vout may be reduced. Therefore, the reliability of the sensing values for calculating the touch coordinates may be relatively high if they are generated by input signals received in a differential manner. However, when the display noise VDN is differently introduced into each terminal, the output signal Vout may be a modulated signal due to the influence of the noise.

Accordingly, the first input signal from the first sensing electrode RXE_a and the second input signal from the second sensing electrode RXE_b may be provided to the first integration circuit 210_a in a differential manner. The first integration circuit 210_a may integrate the first input signal and the second input signal and supply it to other circuits.

Figure 8:
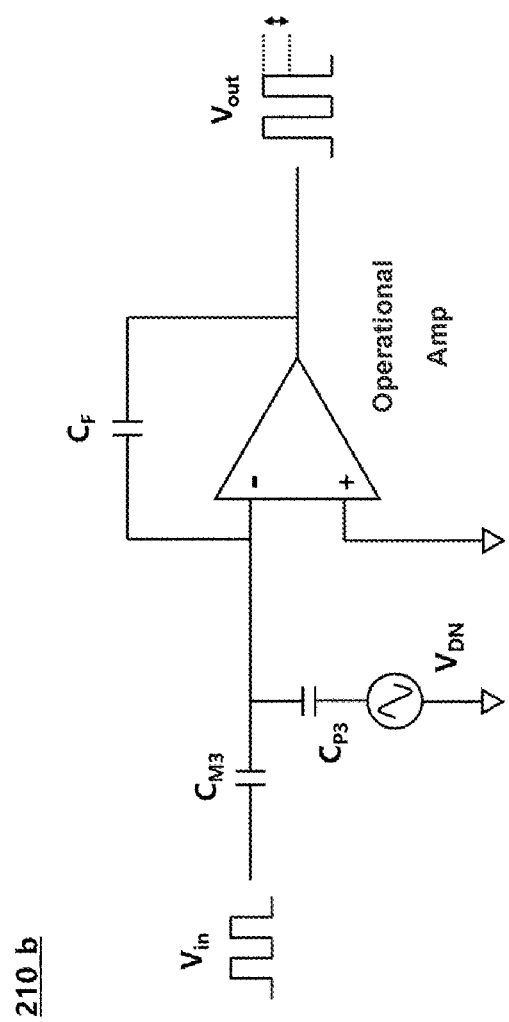
FIG. 8 is a circuit diagram illustrating a second integrator circuit.

FIG. 8 is an exemplary diagram of a second integration circuit.

Referring to FIG. 8, the second integration circuit 210_b according to an embodiment may include a capacitor CM3, a feedback capacitor CF, and an operational amplifier. In addition, a parasitic capacitance CP3 may be formed at an input terminal of the operational amplifier by the display panel, and through this, noise (VDN) due to the display panel may be introduced.

One of the input terminals of the second integration circuit 210_b may be connected to the sensing electrode RXE, and in particular, may be connected to the second sensing electrode (RXE_b) among the sensing electrodes RXE. And, another one of the input terminals of the second integration circuit 210_b may be connected to ground (GND) as shown in FIG. 8 or a signal generator (not shown) capable of generating a preset reference signal. Accordingly, the second integration circuit 210_b may supply a value obtained by integrating only the second input signal from the second sensing electrode (RXE_b) to another circuit, or may provide a value corresponding to a difference between the second input signal and a predetermined reference signal. After integrating the signal, it may be fed into another circuit.

The capacitor CM3 may be charged by the driving signal and discharged to the ground voltage. Also, the capacitor CM3 may correspond to a capacitor charged with a capacitance to be measured by the touch sensing device according to an embodiment. For example, the capacitor CM3 may correspond to mutual-capacitance generated between a plurality of electrodes included in a capacitive touch panel. In this case, the capacitor CM3 may be considered to correspond to a node capacitor in which electric charge is charged or discharged by a change in combined capacitance generated at the intersection of a plurality of electrodes.

The second integration circuit 210_b may receive the input signal Vin in a single method and output an output signal Vout, and the output signal Vout integrates the input signal Vin. It may represent a value. The output signal Vout may be a signal into which a noise component (VDN) from the display panel is introduced.

When the input signal Vin is transmitted in a single method, such as the second integration circuit 210_b, noise from the outside directly affects the output signal Vout, unlike the differential method using the difference between the two signals. In other words, compared to the differential method, in the single method, the value of the output signal Vout may change relatively greatly depending on noise from the outside. Therefore, it is possible to receive an input signal and output a signal in a single method, and estimate the amount of noise generated from the display panel based on this.

Accordingly, the second integration circuit 210_b may receive the second input signal from the second sensing electrode (RXE_b) in a single method and supply the integrated value to another circuit. In case a reference sensing value, which is a criterion for determining the amount of noise, is generated based on this, the amount of noise may be determined without adding another element or device for determining the amount of noise, so the device may be miniaturized.

Figure 9:
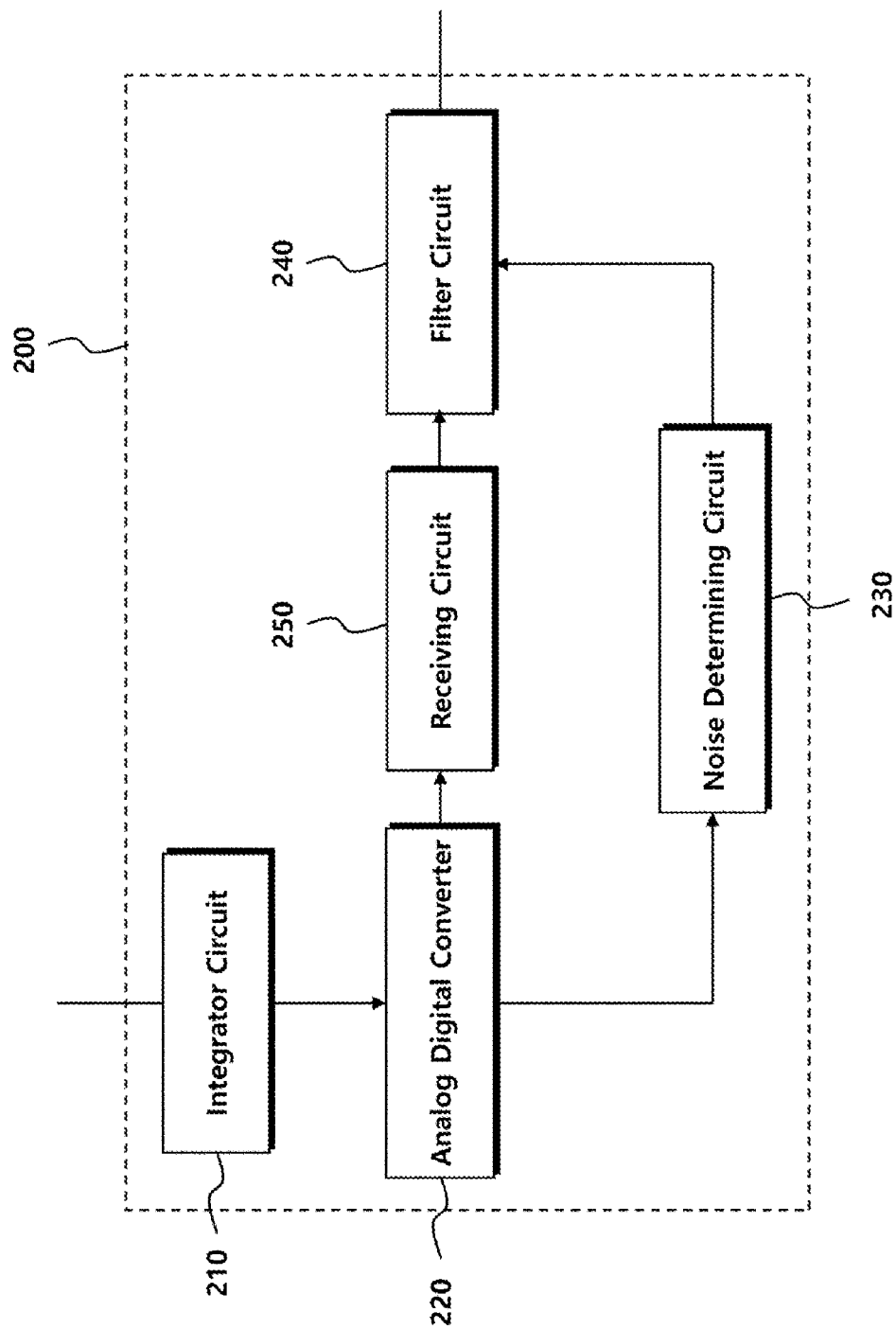
FIG. 9 is a block diagram illustrating a touch sensing device.

FIG. 9 is a block diagram illustrating a touch sensing device.

Referring to FIG. 9, a touch sensing device 200 may comprise a receiving circuit 250, a filter circuit 240, and a noise determination circuit 230. Additionally, the touch sensing device 200 may include one or more components, such as an integration circuit 210 and an analog-to-digital converter (ADC) 220.

The order and arrangement of the receiving circuit 250, the filter circuit 240, the noise determination circuit 230, the integration circuit 210, and the ADC 220 of the touch sensing device 200 may be not limited to the form as shown in FIG. 9 and may have various other configurations. The integration circuit 210 may consist of a first integration circuit 210_a and a second integration circuit 210_b. Furthermore, the integration circuit 210 may be connected to a plurality of sensing electrodes (RXE) located on the touch panel 112 and may also be connected to the ADC 220.

The first integration circuit 210_a can receive a first input signal from the first sensing electrode (RXE_a) and a second input signal from the second sensing electrode (RXE_b) in a differential manner. It may then integrate these signals and transmit the resulting value to the ADC 220. Additionally, the first sensing electrode (RXE_a) and the second sensing electrode (RXE_b) may be coupled to the first driving electrode (TXE a), which receives a driving signal.

The second integration circuit 210_b may receive the second input signal from the second sensing electrode (RXE_b) using a single method and transmit the integrated value to the ADC 220.

The first input signal from the first sensing electrode (RXE_a) and the second input signal from the second sensing electrode (RXE_b) may contain noise components introduced from the display panel 111.

The ADC 220 may be connected to the integration circuit 210. The ADC 220 may be capable of generating digital data through analog-to-digital conversion of the analog amplified signal. In other words, the ADC 220 may receive the integrated values of input signals from the first integration circuit 210_a and the second integration circuit 210_b, and may then convert them into digital data.

Here, the digital data generated by using the first input signal and the second input signal in a differential method may be referred to as a first sensed value, while the digital data generated by using the second input signal in a single method may be called a reference value. In other words, the ADC 220 may transmit the first sensed value to the filter circuit 240 and transmit the reference value to the noise determination circuit 230. Alternatively, the ADC 220 may transmit the first sensed value to the receiving circuit 250, and the receiving circuit 250 may further transmit the first sensed value to the filter circuit 240.

The noise determination circuit 230 may be connected to the ADC 220, and it may also be connected to the filter circuit 240. Furthermore, the noise determination circuit 230 may also be connected to the receiving circuit 250.

The noise determination circuit 230 may receive a reference sensing value from the ADC 220. The reference sensing value may be a digital signal generated by sensing the second input signal from the second sensing electrode (RXE_b) in a single method, and it may contain data representing noise components. As a result, the noise determination circuit 230 may assess the amount of noise by comparing a predefined reference value with the reference sensing value. In other words, the noise determination circuit 230 may determine the level of noise present in the first sensed value through the reference sensed value. By doing so, the noise determination circuit 230 may be capable of controlling the filter circuit 240 based on the amount of noise. To be more specific, it may adjust the filter coefficient of the filter circuit 240 to regulate the degree of filtering applied to the first sensed value. Furthermore, the noise determination circuit 230 may transmit a filter control signal to the filter circuit 240 in order to manage its operation effectively.

The filter circuit 240 may be connected to the ADC 220 and the noise determination circuit 230. Alternatively, it may be connected through the ADC 220 and the receiving circuit 250. The filter circuit 240 may be capable of receiving the first sensed value from the ADC 220 and performing filtering on it. Additionally, the filter circuit may receive the first sensing value from the receiving circuit 250, which in turn receives the first sensing value from the ADC 220, and perform filtering on the first sensing value received from the receiving circuit 250. Moreover, the filter circuit 240 may receive a filter control signal from the noise determination circuit 230, which allows for the adjustment of filter coefficients within the filter circuit 240. As these filter coefficients are adjusted, the extent to which the first sensed value is filtered may be modified. More specifically, if the noise determination circuit 230 determines that the amount of noise is larger than a predefined value (or a threshold value), the filter circuit 240 may significantly increase the degree (or level) of filtering applied to the first sensed value. On the other hand, if the amount of noise is considered smaller than the predefined value, the filter circuit 240 may reduce the degree of filtering applied to the first sensed value.

The filter circuit 240 may perform filtering by utilizing the difference between the first sensed value and a preset baseline. In this context, the baseline may represent a constant value detected by a touch sensor (touch electrode) when the user does not provide any input to the touch panel, and it remains unaffected by external noise. This constant value may be referred to as the baseline. Essentially, the baseline may be considered as a default input value when there is no input on the touch panel. By performing noise filtering using the difference between the baseline and the first sensed value, the filter circuit may effectively filter based on values corresponding to the actual input touch (with or without noise). This approach may reduce the amount of data that needs to be processed, which may result in relative advantages in terms of power consumption and heat generation.

Indeed, adjusting the filtering degree of the filter circuit 240 based on the amount of noise determined by the noise determination circuit 230 may allow for flexible adaptation to varying noise levels. This dynamic noise removal capability may enhance the reliability of touch performance, not only when there is no noise introduced during touch but also when there is a significant amount of noise present. Furthermore, the use of the sensing electrodes existing in the touch panel 112 to determine the amount of noise may eliminate the need for additional devices. This advantageously contributes to the miniaturization of the display module or device since no separate components are required for noise detection. In addition, the ability to adaptively adjust filtering based on noise levels using the touch panel's sensing electrodes may improve touch performance reliability and facilitates compact designs without the need for extra components.

The first sensed value filtered by the filter circuit 240 may then be used for calculating touch coordinates.

Figure 10:
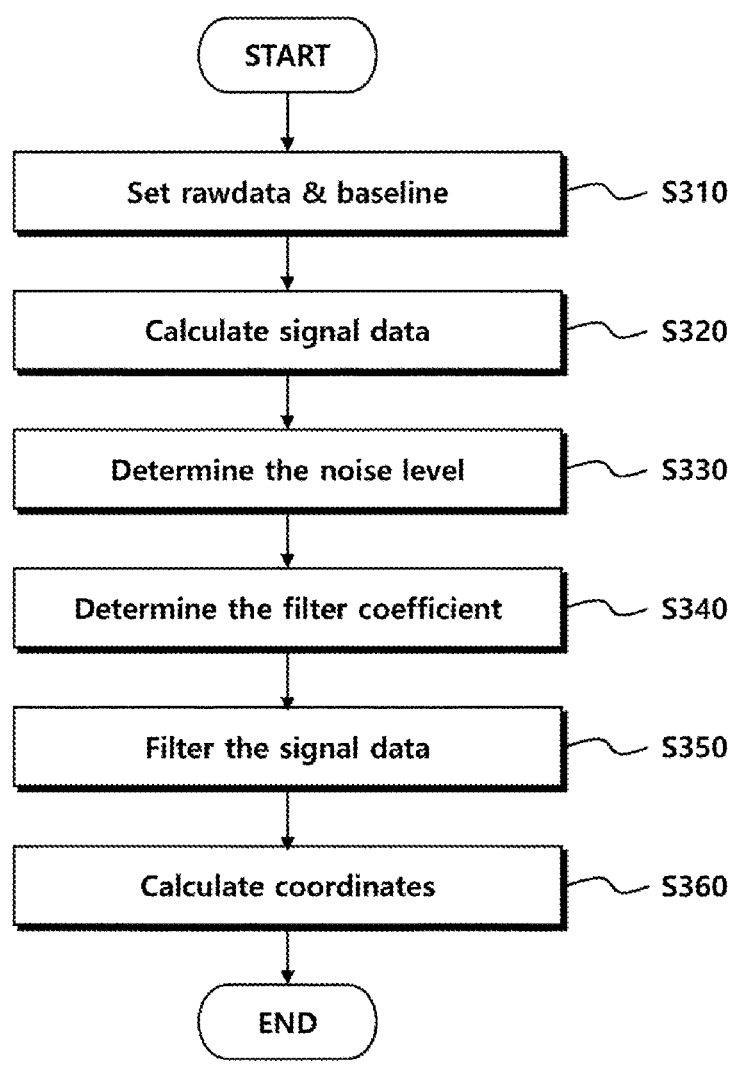
FIG. 10 is a flowchart illustrating a touch sensing method.

FIG. 10 is a flowchart of a touch sensing method.

Referring to FIG. 10, the touch sensing method may include receiving an input signal through the touch panel 112 and setting a baseline in the filter circuit 240 (S310).

Specifically, a touch sensing method may include acquiring touch inputs to a first sensing electrode and a second sensing electrode. A first input signal from the first sensing electrode and a second input signal from the second sensing electrode may be referred to as raw data. Moreover, a touch sensing method may include setting a baseline in the filter circuit.

In addition, noise may be introduced into the first input signal and the second input signal. In this case, the noise may be generated by the display panel. Also, the amount of noise may vary according to a screen pattern of the display panel.

A touch sensing method may include generating a sensing value by calculating and using an input signal (S320).

Specifically, a touch sensing method may include: generating a first sensing value by utilizing a first input signal from a first sensing electrode and a second input signal from a second sensing electrode in a differential method. Moreover, the touch sensing method may include generating a reference sensing value by utilizing the second input signal from the second sensing electrode in a single method. Here, the second sensing electrode may be a sensing electrode disposed at an edge of the touch panel, and the first sensing electrode and the second sensing electrode may be disposed adjacent to each other.

The reference sensing value may be generated based on only the second input signal. The reference sensing value may be generated based on a difference signal between the second input signal and a preset reference signal. Regardless of which one is used, the reference sensing value may be greatly changed according to the inflow of noise.

A touch sensing method may include determining an amount of noise (S330).

Specifically, a touch sensing method may include determining the amount of noise of the first sensing value based on a reference sensing value. The reference sensing value may be data generated by receiving the second input signal in a single method, and change according to the amount of noise. In other words, the reference sensing value may be dependent on the amount of noise. Accordingly, the amount of noise included in the first sensed value through the reference sensed value may be checked.

A touch sensing method may include adjusting filter coefficients (S340).

Specifically, the touch sensing method may include adjusting the filter coefficient of a noise filter based on the amount of noise. In case the amount of noise is relatively large, the degree of filtering may be adjusted significantly. On the other hand, in case the amount of noise is relatively small, the degree of filtering may be adjusted accordingly.

A touch sensing method may include filtering on a sensing value (S350).

Specifically, a touch sensing method according to an embodiment may include filtering a first sensed value with a noise filter having an adjusted filter coefficient. That is, since the filter coefficient is adjusted according to the amount of noise, it is possible to respond adaptively according to the amount of noise, and it is possible to determine the amount of noise without adding a new device, which is advantageous for miniaturization of display modules and devices.

The filtering of the first sensed value may be performed using a difference value of a preset baseline. This reduces the amount of processing data when filtering is performed, so that power consumption and heat generation of the device may be alleviated.

A touch sensing method may include calculating touch coordinates (S360).

Specifically, since the touch coordinates are calculated using the filtered first sensing value and the touch coordinates are calculated with data that is not affected by noise, it is expected that touch performance and reliability is improved.

What is claimed is:

1. A touch sensing device comprising:
   a receiving circuit configured to receive a first sensing value generated in a differential mode using a first input signal provided to a first sensing electrode and a second input signal provided to a second sensing electrode;
   a noise determination circuit configured to receive a reference sensing value generated using the second input signal and determining an amount of a noise of the first sensing value using the reference sensing value, and
   a filter circuit configured to filter the first sensing value,
   wherein the noise determination circuit is configured to adjust a filter coefficient of the filter circuit according to the amount of the noise, and
   wherein the reference sensing value is generated based on a difference between the second input signal and a preset reference signal.

2. The touch sensing device of claim 1, further comprising:
   a first integration circuit connected to the first sensing electrode and the second sensing electrode in a first mode;
   a second integration circuit connected to the second sensing electrode in a second mode; and
   an analog-to-digital-converter configured to receive a value obtained by integrating the first input signal from the first integration circuit and a value obtained by integrating the second input signal from the second integration circuit.

3. The touch sensing device of claim 1, wherein the first sensing electrode and the second sensing electrode are coupled with a first driving electrode receiving a driving signal.

4. The touch sensing device of claim 1, wherein the second sensing electrode is a sensing electrode, which is disposed at an edge of a touch panel, among a plurality of sensing electrodes.

5. The touch sensing device of claim 1, wherein the first sensing electrode and the second sensing electrode are disposed adjacent to each other.

6. The touch sensing device of claim 1, wherein the first sensing electrode and the second sensing electrode are disposed on a display panel.

7. The touch sensing device of claim 6, wherein the noise is generated by parasitic capacitance formed between the first sensing electrode and the second sensing electrode, and the display panel.

8. The touch sensing device of claim 7, wherein the display panel is an Organic Light-Emitting Diode (OLED) panel, and
   wherein the parasitic capacitance is formed by a cathode layer of the OLED panel.

9. The touch sensing device of claim 6, wherein the amount of the noise varies depending on a screen pattern of the display panel.

10. A touch sensing method comprising:
    inputting a touch to a first sensing electrode and a second sensing electrode;
    generating a first sensing value in a differential mode using a first input signal provided to the first sensing electrode and a second input signal provided to the second sensing electrode;
    generating a reference sensing value based on the second input signal;
    determining an amount of a noise of the first sensing value based on the reference sensing value,
    adjusting a filter coefficient of a noise filter in accordance with the amount of the noise; and filtering the first sensing value with the noise filter in which the filter coefficient is adjusted,
wherein the filtering of the first sensing value is operated based on a difference between the first sensing value and a preset baseline, and
wherein the reference sensing value is generated based on a difference between the second input signal and a preset reference signal.

11. The touch sensing method of claim 10, further comprising:
receiving a value obtained by integrating the first input signal from a first integration circuit connected to the first sensing electrode and the second sensing electrode in a first mode and a value obtained by integrating the second input signal from a second integration circuit connected to the second sensing electrode in a second mode.

12. The touch sensing method of claim 10, wherein the second sensing electrode is a sensing electrode, which is disposed at an edge of a touch panel, among a plurality of sensing electrodes.

13. The touch sensing method of claim 10, wherein the first sensing electrode and the second sensing electrode are disposed adjacent to each other.

14. The touch sensing method of claim 10, wherein the first sensing electrode and the second sensing electrode are disposed on a display panel.

15. The touch sensing method of claim 14, wherein the noise is generated by parasitic capacitance formed between the first sensing electrode and the second sensing electrode, and the display panel.

16. The touch sensing method of claim 15, wherein the display panel is an Organic Light-Emitting Diode (OLED) panel, and
wherein the parasitic capacitance is formed by a cathode layer of the OLED panel.

17. The touch sensing device of claim 14, wherein the amount of the noise varies depending on a screen pattern of the display panel.

* * * * *